R. S. LEVESQUE.
WINDMILL.
APPLICATION FILED DEC. 14, 1918.

1,359,180.

Patented Nov. 16, 1920.

Inventor.
R. S. Levesque
By H. R. Kerslake
Atty.

UNITED STATES PATENT OFFICE.

RALPH STANLEY LEVESQUE, OF CAMBRIDGE, AUCKLAND, NEW ZEALAND.

WINDMILL.

1,359,180.  Specification of Letters Patent.  Patented Nov. 16, 1920.

Application filed December 14, 1918. Serial No. 266,689.

*To all whom it may concern:*

Be it known that I, RALPH STANLEY LEVESQUE, a citizen of the Dominion of New Zealand, and residing at Victoria Road, Cambridge, in the Provincial District of Auckland, in the Dominion of New Zealand, have invented certain new and useful Improvements in Windmills, of which the following is a specification.

This invention provides an improved windmill characterized by hollow horizontally rotating vanes approximately pyramidal in shape and truncated at their apexes, whereby holes are left for the passage of air; also a brake of novel construction for controlling the speed of rotation of the vanes.

The invention may be conveniently and advantageously carried into practice as illustrated in the accompanying drawing, wherein:—

Figure 2:
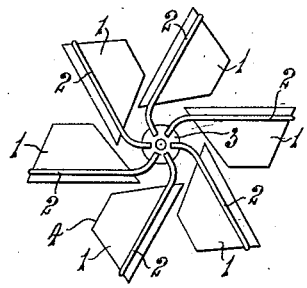
Figure 1:
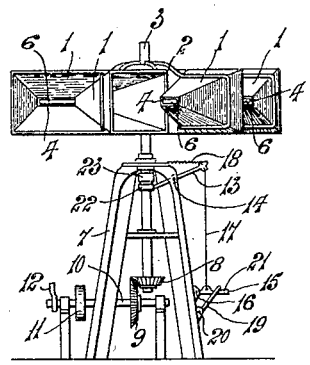
Figure 3:
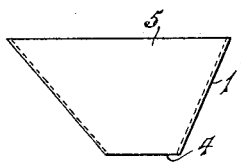
Figure 4:
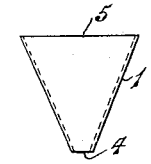
Figure 5:
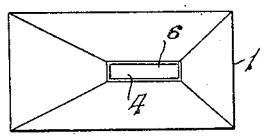

Figure 1, is an elevation of the windmill.
Fig. 2, a plan of the vanes.
Fig. 3, a plan,
Fig. 4, an end view and
Fig. 5, a front elevation of a vane.

The vanes 1 are secured to horizontal arms 2, which are fixed to and radiate from a central shaft 3. Each vane 1 is approximately pyramidal in shape, the center of truncated apex 4 falling laterally outward of the center line of the base 5, and falling vertically centrally of the center line of the said base. The truncating of the vanes leaves a hole 6 for the passage of air, which passing through any one of the vanes, is owing to the shape of the vanes made to impinge on the sloping outer side of the next succeeding vane until the power of the wind is exhausted. By using the power of the wind in the above manner, the efficiency of the windmill is greatly increased.

The vanes are conveniently made of corrugated sheet iron, which gives stiffness for preserving the shape thereof.

By arranging the vanes to rotate horizontally the windmill is always ready to be operated by the wind independent of from what point of the compass it may be blowing.

The shaft 3 is mounted vertically in a stand or frame 7, and by means of bevel wheels 8 and 9 transmits motion to a horizontal shaft 10 provided with a pulley 11 and crank 12. Rotary motion for operating machines such as a chaff cutter or other machine is obtained from the pulley 11, and reciprocating motion for working a pump or other reciprocating machine is obtained from the crank 12.

The brake for controlling the speed of the vanes comprises a lever 13 pivoted on a pin 14, a lever 15 pivoted upon a pin 16 and connected to the lever 13 by a rod or cord 17, a spring 18 connecting the outer end of the lever 13 to the stand 7, and a catch 19 pivoted upon a pin 20 and adapted to engage any one of the teeth 21 of a rack formed upon the lever 15. The inner end of the lever 13 has a bifurcated end 22, which takes against a shoulder 23 formed on the shaft 3.

The brake is applied by depressing the lever 15, which pulls down the lever 13, and presses the bifurcated end 22 forcibly against the shoulder 23, thereby setting up friction which retards the speed of rotation of the vanes. The catch 19 falls by gravity into engagement with the teeth 21, and retains the lever 15 after the same has been depressed. When the lever 15 is raised after releasing the catch 19, the spring 18 raises the outer end of the lever 13, and removes the pressure of the bifurcated end 22 from the shoulder 23, thereby leaving the vanes 1 free to rotate at increased speed.

What I do claim and desire to secure by Letters Patent of the United States is:—

A windmill including a vertical shaft, and a series of hollow pyramidal vanes carried by said shaft and movable in a horizontal plane, said vanes being circularly arranged around said shaft, the base and apex ends of each of said vanes being open and the apex end of each vane being arranged in close proximity to the base end of each following vane, an imaginary line drawn through the axis of each vane being arranged at substantially right angles to and intersecting the outer side of the following vane so that the outer side of each vane is in position to directly receive an air blast from the apex of the preceding vane.

In testimony whereof I have signed my name to this specification in the presence of two witnesses.

RALPH STANLEY LEVESQUE.

Witnesses:
W. W. CONNELL,
D. E. RAPSON.